United States Patent [19]

Seegopaul et al.

[11] Patent Number: 5,728,197
[45] Date of Patent: Mar. 17, 1998

[54] RECLAMATION PROCESS FOR TUNGSTEN CARBIDE/COBALT USING ACID DIGESTION

[75] Inventors: Purnesh Seegopaul, Flemington; Li Wu, Plainsborough, both of N.J.

[73] Assignee: Nanodyne Incorporated, New Brunswick, N.J.

[21] Appl. No.: 690,148

[22] Filed: Jul. 17, 1996

[51] Int. Cl.$^6$ .................................................. B22F 9/00
[52] U.S. Cl. ................................ 75/710; 75/414; 75/419; 75/425; 75/709; 75/710
[58] Field of Search ...................... 75/414, 419, 425, 75/709, 710

[56] References Cited

U.S. PATENT DOCUMENTS

| | | | |
|---|---|---|---|
| 3,887,680 | 6/1975 | MacInnis et al. | 423/55 |
| 3,953,194 | 4/1976 | Hardline, III et al. | |
| 4,798,708 | 1/1989 | Ladd et al. | 423/55 |
| 4,851,041 | 7/1989 | Polizzotti et al. | 75/240 |
| 5,230,729 | 7/1993 | McCandlish et al. | 75/351 |
| 5,352,269 | 10/1994 | McCandlish et al. | 75/351 |
| 5,417,945 | 5/1995 | Gingerich et al. | 423/56 |
| 5,599,514 | 2/1997 | Gardano et al. | 423/55 |

*Primary Examiner*—David A. Simmons
*Assistant Examiner*—M. Alexandra Elve
*Attorney, Agent, or Firm*—Wood Herron & Evans

[57] ABSTRACT

Tungsten carbide cobalt and tungsten-containing materials are recycled using a single high-temperature oxidation with standard dilution chemistry. The scrap material is ground, oxidized, and subjected to an acid digestion, preferably in hydrochloric acid. This causes the cobalt to form cobalt chloride while the tungsten remains insoluble. The pH is then increased to about 7.0 which causes the cobalt chloride to form cobalt hydroxide which precipitates out of solution. The cobalt and tungsten are separated and dissolved in a high-pH ammonia solution which can then be spray dried to form a precursor powder for subsequent carburization to form tungsten carbide-cobalt powders.

12 Claims, No Drawings

RECLAMATION PROCESS FOR TUNGSTEN CARBIDE/COBALT USING ACID DIGESTION

BACKGROUND OF THE INVENTION

Tungsten carbide is widely used today in cutting tools, mining tools and wear parts. The material can be produced by a variety of different manufacturing processes. Several preferred methods of forming grains of tungsten carbide embedded in a cobalt matrix are disclosed in Polizotti U.S. Pat. No. 4,851,041, as well as McCandish U.S. Patent Nos. 5,230,729 and 5,352,269.

Tungsten and tungsten carbide products are relatively expensive, and there is an extreme need to recover scrap by recycling spent and unused tungsten carbide and tungsten-based products, both for environmental and cost reasons.

There are several processes currently used to recycle tungsten carbide and tungsten products. These processes include the zinc process, the coldstream process, an alkali-leach process, chlorination systems, electrolysis, and high-temperature smelting. With the exception of the zinc and coldstream processes, the other chemical methods involve numerous conversion, extraction and precipitation steps that increase the cycle time and cost. Many of these chemical methods involve the use of acids, bases, and various inorganic salts.

The zinc and cold stream processes do permit a direct conversion into usable powder, but material purity is a problem, and thus the application for this type of reclaimed material is extremely limited. Typically, the more common zinc process involves heating, sublimation, and crushing processes to recover WC-Co powder. A key difference is that the zinc process leaves the grain size intact, causing successive grain growth on each cycle.

SUMMARY OF THE INVENTION

The present invention is premised on the realization that tungsten and tungsten carbide materials can be reclaimed relatively inexpensively. According to the present invention, tungsten carbide scrap, tungsten and tungsten-containing materials scrap are oxidized to form tetragonal and octahedral tungsten trioxide which is insoluble in water at neutral pH. This is digested in an acidic solution to dissolve the cobalt, but not the tungsten. The pH of the combined solution/slurry is raised to between 6 and 10 to precipitate cobalt as cobalt hydroxide, cobalt oxychloride and traces of other cobalt compounds. The solids, i.e., tungsten and cobalt compounds, are separated from the slurry and redissolved in an aqueous solution having a pH>11. This can be spray dried to form a precursor composition for further carburization and the formation of tungsten carbide or tungsten carbide held in a cobalt matrix. If desired, the cobalt can be separated after precipitation by redissolving it once separated from chloride solutes. The objects and advantages of the present invention will be further appreciated in light of the following description.

DETAILED DESCRIPTION

In the present invention, tungsten-containing materials are recycled to form a precursor composition suitable for formation of tungsten carbide and other composite materials. The tungsten material which can be used in the present invention includes elemental tungsten, tungsten carbide, tungsten oxides, tungsten-copper, tungsten-silver, tungsten nitride, tungsten boride, tungsten selenide, tungsten sulfide, tungsten silicide and tungsten carbide with a binder such as cobalt, nickel or iron.

This material will generally be waste material and is referred to in the industry as "hard scrap" or "soft scrap." Hard scrap would be previously sintered material, and soft scrap would be unsintered powder. With respect to hard scrap, this should be crushed to a small size suitable for loading into a rotary furnace. While it is preferred that the crushed size be down to a few millimeters to increase the reaction rate, fragments in the range of 1 to 6 inches can also be utilized.

The tungsten-based materials are oxidized at temperatures in the range of 850°–1200° C., preferably at about 950° C. This is accomplished by heating the tungsten-based material in an oxidizing atmosphere with air or oxygen-air mixtures. The oxidation time will vary depending on batch size. A batch size of 10 pounds will require about 2–3 lfm of air, taking about 12 hours for complete oxidation. Different types of high-temperature furnaces can be employed for the oxidation. However, it is preferable to conduct the work in a rotary furnace where the oxidized surfaces are continually abraded to yield fresh, new surfaces for efficient processing. This high-temperature oxidation of the tungsten materials produces tetragonal and othrohombic tungsten oxide species which are not normally soluble in aqueous media. The binder metal such as cobalt, if present, forms a cobalt complex such as tungstates, and in this case cobalt tungstate.

The products from the oxidation are then subjected to an acid digestion. Preferably, this will be an aqueous acid solution having a pH of 2.0 down to 1.0 or less. Preferably, the pH should be less than 1. The aqueous acidic solution is preferably formed from hydrochloric acid. However, other strong acids such as phosphoric acid, sulfuric acid, and nitric acid can be employed. In this digestion, the tungsten oxide basically remains as tungsten oxide while the metallic tungstates are converted to a chlorine species such as cobalt chloride, and the tungsten converted to tungstic acid or hydrated tungstic acids such as $WO_3.H_2O$ and $WO_3.2H_2O$.

Other additives present in the material will be converted to chloride species or complex chloride species, and most are solubilized with the metallic chlorides which, in this case, would be cobalt chloride.

The tungsten species will remain insoluble. Thus the acid digestion produces a slurry containing undissolved tungsten compounds and dissolved cobalt species.

This slurry can be dried to precipitate cobalt chloride in the presence of tungstate and $WO_3.H_2O$. The cobalt chloride can then be redissolved to form a solution and can be treated separately, if needed.

Alternately and preferably, this mixture will be treated with alkali to increase its pH to about 6.0 to 8.5. This can be done by bubbling ammonia gas into the slurry or with ammonium hydroxide solution. At this stage, the cobalt is precipitated as a hydroxide or oxychloride, while the tungsten remains as an insoluble species, $WO_3$ and $WO_3.H_2O$. This is then filtered and washed. The impurities such as the cobaltamine and other chloride species will be separated and discarded.

The filtrate or residue is then redissolved in an ammonia-based solution having a pH greater than 11. Again, ammonia gas can be bubbled into the aqueous media to obtain the desired pH. This will cause the cobalt and tungsten to dissolve, forming primarily a cobalt/amine complex and ammonium tungstate. Species such as iron titanium, tantalum, chromium, aluminum and magnesium will all remain insoluble or precipitate during this procedure if any are present.

The concentration of tungsten and binder elements can be measured by any appropriate analytical method, such as atomic absorption and emission spectroscopic (ICP) techniques. If desired, the ratio of binder metal to tungsten can then be adjusted by adding either a water-soluble binder salt such as cobalt nitrate or ammonium metatungstate to the solution. This solution can then be spray dried to form a precursor powder which is suitable for formation of tungsten carbide by subjecting it to elevated temperatures in the presence of a carburizing gas, as is now well known in the industry.

This method greatly simplifies the steps required to recycle tungsten/cobalt compositions. It is particularly suitable for subsequent reuse of the tungsten and cobalt to form tungsten carbide cobalt complexes.

This has been a description of the present invention, along with a preferred method of practicing the present invention.

However, the invention itself should only be defined by the appended claims wherein we claim:

1. A method of recycling a tungsten/cobalt composition comprising oxidizing said tungsten/cobalt composition at a temperature in excess of 850° C. to form an oxidized composition;
    digesting a portion of said oxidized composition in an aqueous acidic solution to form a slurry of dissolved cobalt composition combined with solid tungsten species;
    neutralizing said slurry to a pH effective to cause cobalt hydroxide or cobalt oxychloride to precipitate, and separating liquid components from solid components of said slurry.

2. The method claimed in claim 1 further comprising dissolving said solid components in an aqueous medium having a pH greater than 11.0 and filtering said aqueous medium to remove any undissolved particulate matter.

3. The method claimed in claim 2 further comprising spray drying said aqueous medium.

4. The method claimed in claim 3 wherein said aqueous medium is an aqueous solution of ammonia.

5. The method claimed in claim 1 wherein said high temperature oxidation is conducted at from 850° to 1200° C. in the presence of oxygen.

6. The method claimed in claim 5 further comprising forming tungsten carbide by spray drying said aqueous medium and carburizing formed particles.

7. The method claimed in claim 6 further comprising adding a soluble salt of a carrier metal to said aqueous medium to establish a desired ratio of carrier metal to tungsten, and spray drying and carburizing said aqueous solution to form a carrier metal/tungsten carbide complex.

8. The method claimed in claim 1 wherein said acidic solution is an aqueous solution of an acid selected from the group consisting of sulfuric acid, phosphoric acid and nitric acid.

9. The method claimed in claim 3 further comprising adding a soluble salt of cobalt to said aqueous medium to establish a desired ratio of cobalt to tungsten, and spray drying and carburizing said aqueous solution to form a cobalt/tungsten carbide matrix.

10. The method claimed in claim 3, further comprising dissolving additional soluble salt of tungsten in said aqueous medium to establish a desired ratio of cobalt to tungsten.

11. The method claimed in claim 1 further including filtering insoluble material from said slurry.

12. The method claimed in claim 1 further including adding chelating agents to said slurry.

* * * * *